June 21, 1938.  W. A. FLUMERFELT  2,121,481
WEIGHING SCALE
Filed Aug. 22, 1936

INVENTOR.
William A. Flumerfelt.
BY
ATTORNEYS.

Patented June 21, 1938

2,121,481

UNITED STATES PATENT OFFICE 2,121,481

WEIGHING SCALE

William A. Flumerfelt, Columbus, Ohio, assignor to Bonded Scale Company, Columbus, Ohio, a corporation of Ohio Application August 22, 1936, Serial No. 97,433

4 Claims. (Cl. 308—2)

My invention relates to weighing scales. It has to do, more particularly, with a self-aligning knife-edge bearing for weighing scales. More specifically, my invention is applicable to that type of scale wherein a horizontal beam is provided with oppositely extending knife-edge pivots that rest on bearings at opposite sides of the beam.

In order for a scale of this type to weigh accurately it is necessary for the bottoms of the V-grooves in the bearings at opposite sides of the beam to be in exact horizontal alignment. If the bearings are rigidly secured in place on the standard or support which carries the beam, it is necessary to mount the standard very accurately so that the bottoms of the V-grooves will be in exact horizontal alignment. This is difficult to do and sometimes impossible, especially if the standard is distorted. Furthermore, although the V-grooves may initially be in exact horizontal alignment, if the standard or other associated parts warp or are distorted in any way the V-grooves might be thrown out of alignment and, therefore, the scales will not weigh accurately.

Attempts have been made to overcome the above-indicated disadvantages by providing two separate bearings which are disposed on opposite sides of the beam, each of which is pivoted to the standard so that it may rock about a horizontal axis. It was thought that this structure would be self-aligning and would compensate for the standard not being properly levelled or for distortion of the standard or other parts. However, this structure is not very satisfactory. It is not strictly self-aligning because the bearings are pivoted to the beam standard. It is difficult to initially align the V-grooves of the two separate bearings and they will not stay in exact horizontal alignment. Furthermore, it is difficult to make the two bearings so that they will be exactly alike and it is difficult to install them so that they will be in exact alignment with each other.

One of the objects of my invention is to provide a bearing of the type indicated for weighing scales which is strictly self-aligning and which will always automatically adjust itself to compensate for any inaccuracies in the scale structure, due to the beam support being out of level or distorted or because associated parts of the scale are out of level or distorted.

Another object of my invention is to provide a bearing for a knife-edge which is not only self-aligning but which also is of very simple structure and, therefore, can be produced at a low cost and which can be easily installed on a scale.

In its preferred form my invention contemplates the provision of a self-aligning knife-edge bearing which is particularly applicable to that type of scale wherein a substantially horizontally disposed beam is provided with knife-edge pivots extending substantially at right angles thereto from opposite sides thereof. The beam is mounted on a standard by means of the self-aligning bearing which I provide. This bearing is made in one piece and is substantially U-shaped, the upper ends being provided with V-grooves which are in exact alignment with each other and which will always be maintained in alignment because the bearing is made in one piece. The bearing is so mounted on the standard that the upper ends of the U-shaped bearing are disposed at opposite sides of the beam and the grooves formed therein receive the knife edges projecting from opposite sides of the beam. The lower portion of the bearing is rounded and it rests on the rounded bottom of a socket formed in the beam standard. Thus, the bearing is free in the socket to automatically adjust itself so that the V-grooves formed in the upper ends thereof will always be disposed horizontally even though the support is not properly levelled or is distorted.

The preferred embodiment of my invention is illustrated in the accompanying drawing wherein similar characters of reference designate corresponding parts and wherein.

Figure 4:
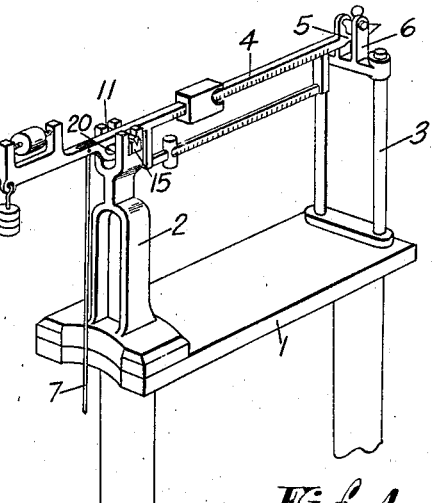
Figure 4 is a perspective view illustrating a portion of a scale of the type to which my bearing may be applied.

With reference to the drawings and particularly to Figure 4 I have shown a portion of a scale of the type to which my invention is particularly applicable. This scale is what is commonly known as the platform type and includes a base 1 which supports standards 2 and 3. The standard 2 is a beam-supporting standard and pivotally supports the indicating beam 4. This beam is provided with a portion 5 that projects into a slot formed in a structure 6 on the upper end of the standard 3 so that movement of the beam is limited. The beam is connected in a well-known way to the platform by means of a rod 7.

As previously stated, the standard 2 supports the beam 4 for pivotal movement. The upper end of this standard is illustrated best in Figures 1 and 3. The upper end is substantially U-shaped having arms 8 and 9 with a longitudinally extending slot 10 formed therebetween. The beam 4 is adapted to be disposed within this slot 10, as indicated in the drawing. The arm 8 is provided with a transversely extending slot 11 and the arm 9 with a transversely extending slot 12. The slots 11 and 12 are in exact alignment with each other. The bottom of the slot 11 is rounded as indicated at 13 in Figure 3 and the bottom of the slot 12 is similarly rounded as indicated at 14. The surfaces 13 and 14 form a continuation of each other. Thus, there is a socket formed in the upper end of the standard 2 which is adapted to receive my self-aligning knife-edge bearing 15 which is indicated in Figure 2.

This bearing 15 is made of a single piece of material such as metal. It is provided with a rounded or curved lower edge 16 which is of the same curvature as the surfaces 13 and 14 and is adapted to rest thereagainst. It is preferable that curved surfaces 13, 14, and 16 be struck from a common center. However, surfaces 13 and 14 can be plane surfaces disposed at an angle to form a V-shaped socket for the bearing 15. In such case, the curved surface 16 of the bearing would rest and oscillate on the angularly disposed surfaces corresponding to surfaces 13 and 14. A notch 17 is formed therein, adjacent its upper edge, so that the bearing 15 is of substantially U-shaped form. In the upper ends of this U-shaped bearing, V-grooves 18 and 19 are formed. These V-grooves are in exact alignment with each other. In order to insure that they are in exact alignment and are of exactly the same dimensions, it is preferable to machine the upper edge of the bearing 15 before the notch 17 is formed therein so as to form a continuous cut from one end to the other. The notch 17 may then be formed in the bearing 15 and will separate the grooves 18 and 19.

Figure 1:
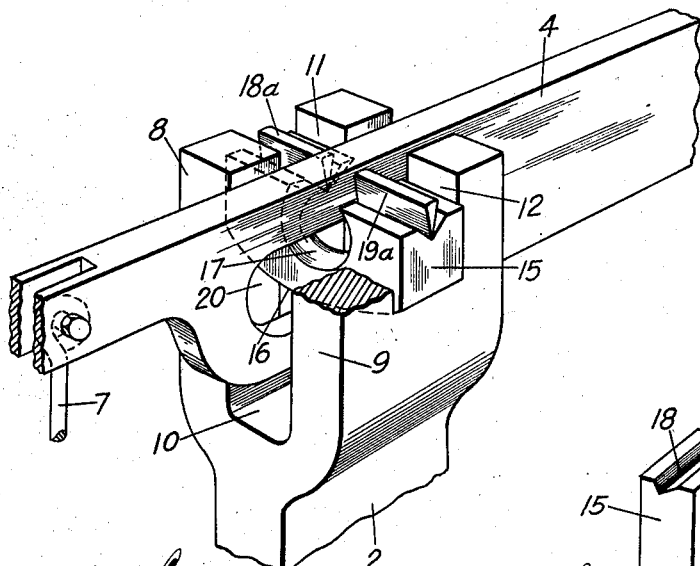
Figure 1 is a perspective view partly broken away showing my self-aligning bearing mounted on the beam standard.
Figure 2:
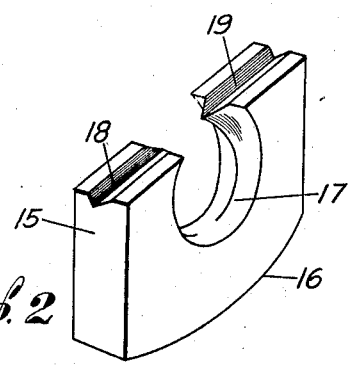
Figure 2 is a perspective view of the bearing itself.

It will be noted from Figure 1 that the beam 4 is provided with a knife-edge pivot which has portions 18a and 19a extending from opposite sides of the beam and substantially at right angles thereto. It will also be noted that the beam 4 is provided with a longitudinally extending slot 20.

In setting up the scale the base 1 is set in place and the standard 2 is then mounted on the base. One end of the bearing 15 is slipped through the slot 20 of the beam. The beam 4 is then slipped into the slot 10 and simultaneously the bearing 15 is slipped into the slots 11 and 12. At this time the knife edges 18a and 19a are preferably disposed in the grooves 18 and 19 respectively. The curved lower edge 16 of the bearing 15 will rest on the curved surfaces 13 and 14. The upper portion of the beam will extend through the notch 17 while the lower portion of the beam will be disposed below the bearing. The slot 10 and the notch 17 are of sufficient width so as not to interfere with swinging of the beam. Also, the slot 20 is of sufficient width to prevent interference with movement of the beam.

Figure 3:
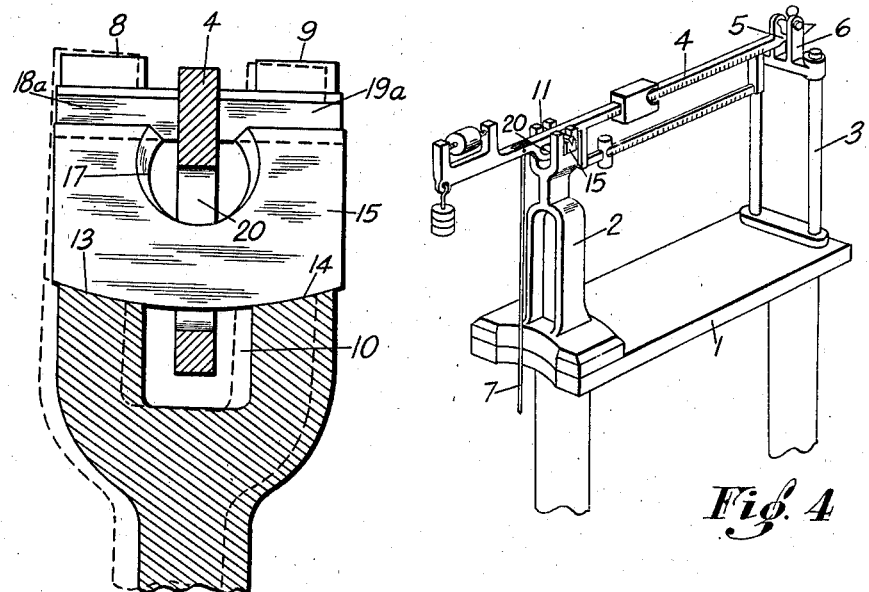
Figure 3 is a vertical section taken through a portion of the beam standard and illustrating how the bearing will automatically adjust itself in case the beam standard is not properly levelled or is distorted.

The bearing 15 will be disposed in its socket in such a manner that it may automatically adjust itself to maintain the V-grooves 18 and 19 exactly horizontally. The slots 11 and 12 in the standard are of sufficient width to permit the curved surface 16 to slide relative to the curved surfaces 13 and 14, if necessary for the bearing to adjust itself. Whenever the standard 2 is not exactly vertically disposed or is distorted, as indicated in Figure 3, the bearing 15 will automatically adjust itself in the socket so that the grooves 18 and 19 will always be disposed exactly horizontally. Thus, accuracy of the scale will always be insured.

It will be apparent from the above description that I have provided a knife-edge bearing having many advantages. This knife-edge bearing is strictly self-aligning and will automatically adjust itself at all times to compensate for any inaccuracies in the scale structure due to the beam support being out of level or distorted. This bearing is of a very simple structure and can be produced at a low cost. Furthermore, it can be installed easily on a scale.

Although in the preceding description I specify that the knife edges are carried by the beam and the V-grooves are formed in the bearing 15, it is to be understood that this may be reversed. That is, the knife edges may be carried by the upper ends of the bearing 15 and the V-grooves may be formed in members projecting from opposite sides of the beam in the same manner that the knife-edge members project therefrom. In the following claims, although I specify that the V-grooves are in the bearing and the knife edges are on the beam I intend to cover the reversal of parts indicated above.

Various other advantages will be apparent from the preceding description, the drawing and the following claims.

Having thus described my invention, what I claim is:

1. In combination, a weighing beam having knife edges projecting from opposite sides thereof and disposed substantially at right angles thereto, a standard for supporting the beam, said standard having its upper end of substantially U-form so that a longitudinally extending slot is formed therein which receives the beam, the arms of said U-shaped upper end of the standard having transversely extending slots formed therein which are in alignment with each other, the bottom of each of said slots being curved, said slots being adapted to receive a knife-edge bearing, said knife-edge bearing being formed in one piece and having a notch in its upper edge so that it is substantially U-shaped, said U-shaped bearing having V-grooves formed in the upper ends thereof which are exactly in alignment with each other, the lower edge of said bearing being rounded, said bearing being disposed in the transverse slots formed in the upper end of the standard and the rounded lower edge of said bearing resting on the curved bottoms of said slots, the V-grooves formed in the upper ends of said bearing being adapted to receive and support said knife edges which project from opposite sides of the beam.

2. In combination, a weighing beam having knife edges projecting from opposite sides thereof and disposed substantially at right angles thereto, a standard for supporting the beam, said standard having a longitudinally extending slot formed therein which receives the beam and having a transversely extending socket formed therein, a knife-edge bearing, said knife-edge bearing being substantially U-shaped and having V-grooves formed in the upper ends thereof which are in alignment with each other, said bearing having a curved lower edge, said socket in said standard having a curved bottom adapted to cooperate with the curved lower edge of said bearing when it is disposed in said socket, the upper ends of said bearing being disposed on opposite sides of said beam and the V-grooves formed therein being adapted to receive the knife edges projecting from opposite sides of the beam.

3. In combination, a weighing beam having knife edges projecting from opposite sides thereof and disposed substantially at right angles thereto, a standard for supporting the beam, said standard having a transversely extending socket formed therein, a knife-edge bearing, said knife-edge bearing being formed in a single piece and being disposed in said socket, said bearing having portions disposed on opposite sides of the beam and having a curved lower edge resting on the bottom of said socket, said socket being so formed that the bottom forms a cradle for the bearing on which it may oscillate, said portions on opposite sides of the beam having V-grooves which are in alignment with each other and which are adapted to receive the oppositely projecting knife-edges of the beam, the cradle at the bottom of said socket and the cooperating curved lower edge of the bearing permitting self-adjustment of the bearing in the socket.

4. In combination, a weighing beam having knife edges projecting from opposite sides thereof, a standard for supporting the beam, said standard having a socket formed therein, a knife-edge bearing disposed in said socket, said knife-edge bearing being formed in a single piece and having a curved surface that cooperates with a cradle formed at the bottom of said socket, said bearing having portions disposed on opposite sides of the beam having V-grooves therein which are in alignment with each other and which are adapted to receive the oppositely projecting knife edges of the beam, the cradle at the bottom of said socket and the cooperating curved surface of the bearing permitting self-adjustment of the bearing in the socket.

WILLIAM A. FLUMERFELT.